US007624489B2

(12) United States Patent
Rohde et al.

(10) Patent No.: US 7,624,489 B2

(45) Date of Patent: Dec. 1, 2009

(54) METHOD OF MANUFACTURING A PLURALITY OF PLATES FOR A PADLOCK

(75) Inventors: Christopher Rohde, West Allis, WI (US); John Blomstrom, Milwaukee, WI (US); John Weber, Thiensville, WI (US); Robert Rice, Eagle, WI (US)

(73) Assignee: Master Lock Company LLC, Oak Creek, WI (US)

( * ) Notice: Subject to any disclaimer, the term of this patent is extended or adjusted under 35 U.S.C. 154(b) by 91 days.

(21) Appl. No.: 12/041,964

(22) Filed: Mar. 4, 2008

(65) Prior Publication Data

US 2008/0148548 A1 Jun. 26, 2008

Related U.S. Application Data

(62) Division of application No. 11/724,772, filed on Mar. 16, 2007, now Pat. No. 7,481,085.

(60) Provisional application No. 60/782,821, filed on Mar. 16, 2006, provisional application No. 60/783,312, filed on Mar. 17, 2006, provisional application No. 60/783,992, filed on Mar. 20, 2006.

(51) Int. Cl.
*B23P 17/00* (2006.01)

(52) U.S. Cl. ............................ 29/412; 29/414; 29/415; 29/417; 72/338

(58) Field of Classification Search .................. 29/412, 29/414, 415, 417; 72/335, 336, 337, 338, 72/339, 373, 379.2; 70/51, 52, 53, 54, 55, 70/56

See application file for complete search history.

(56) References Cited

U.S. PATENT DOCUMENTS

| | | | | |
|---|---|---|---|---|
| 1,016,455 | A | 2/1912 | Stone | |
| 3,548,486 | A | 12/1970 | Foote | |
| 3,739,623 | A * | 6/1973 | Kramer | 72/339 |
| 3,835,676 | A | 9/1974 | Foote | |
| 3,848,440 | A | 11/1974 | Manuel | |
| 3,983,725 | A | 10/1976 | Manuel et al. | |

(Continued)

FOREIGN PATENT DOCUMENTS

DE 2706302 B2 2/1981

OTHER PUBLICATIONS

International Search Report and The Written Opinion of the International Searching Authority in PCT/US07/06683, mailed Dec. 18, 2007.

(Continued)

*Primary Examiner*—Jermie E Cozart

(74) *Attorney, Agent, or Firm*—Calfee, Halter & Griswold LLP

(57) ABSTRACT

A padlock includes a lock body, a shackle, and a sleeve. The lock body includes opposed front and rear longitudinally extending side walls terminating at first and second end portions. The shackle extends from the first end portion of the lock body. The sleeve covers at least a portion of each of the longitudinally extending side walls, and an internal surface of the sleeve includes at least one longitudinally extending rib contacting at least one of the front and rear longitudinally extending side walls to define a gap between the sleeve and the lock body.

7 Claims, 15 Drawing Sheets

U.S. PATENT DOCUMENTS

| | | | | |
|---|---|---|---|---|
| 4,224,813 | A | 9/1980 | Hampton | |
| 4,285,754 | A * | 8/1981 | DiMatteo | 156/264 |
| 4,317,344 | A | 3/1982 | Barnard | |
| 4,524,507 | A * | 6/1985 | Hara et al. | 29/564.2 |
| 4,738,020 | A * | 4/1988 | Neuenschwander | 29/598 |
| 4,793,644 | A | 12/1988 | Swift | |
| 5,087,849 | A * | 2/1992 | Neuenschwander | 310/216 |
| 5,123,155 | A * | 6/1992 | Neuenschwander | 29/596 |
| 5,671,526 | A * | 9/1997 | Merlano | 29/609 |
| 6,705,134 | B2 | 3/2004 | Miranda | |
| 2005/0155396 | A1 | 7/2005 | Taljaard et al. | |
| 2006/0070233 | A1 * | 4/2006 | Neuenschwander et al. | 29/609 |

OTHER PUBLICATIONS

Office Action dated Jun. 19, 2008 from the U.S. Appl. No. 11/724,772.

* cited by examiner

METHOD OF MANUFACTURING A PLURALITY OF PLATES FOR A PADLOCK

CROSS REFERENCE TO RELATED APPLICATIONS

This application is a divisional application of U.S. Ser. No. 11/724,772, filed Mar. 16, 2007, now U.S. Pat. No. 7,481,085, has been allowed, which claims the benefit of the following U.S. Provisional Patent Applications, the entire disclosures of which are hereby incorporated by reference, to the extent that they are not conflicting with the present application: App. Ser. No. 60/782,821, entitled "Lock Shackle" and filed Mar. 16, 2006; App. Ser. No. 60/783,312, entitled "Lock Sleeve" and filed Mar. 17, 2006; and App. Ser. No. 60/783,992, entitled "Lock Plate and Process of Making Same" and filed Mar. 20, 2006.

BACKGROUND

Padlocks are used in a variety of applications, including, for example, with enclosures such as lockers, storage sheds, and various gates and doors. A typical padlock includes a generally rectangular lock body having a generally U-shaped shackle extending from one end and a keyway disposed on an opposite end. When a proper key is inserted in the keyway, a key cylinder within the lock body may be rotated to disengage a locking mechanism from the shackle, allowing the shackle to slide out of the lock body until a short leg of the shackle is fully removed from the lock body, allowing removal of the lock from a hasp or other such portion of an enclosure to be locked.

One type of padlock includes a laminated lock body, in which a series of plates are secured together in a stack to define a lock body having internal cavities for receiving the shackle, the key cylinder, and the locking mechanism. These plates are commonly manufactured from a sheet or strip of material in which the plate is stamped or otherwise cut from a larger web or portion of the strip. Cutouts are formed in each plate (by stamping or other cutting operations) to define internal cavities of the lock body and/or openings for fasteners (such as rivets) for securing the plates together in a stack.

While such a technique may provide a cost efficient lock body for a padlock, the conventional laminated padlock may be subject to some cost, design, and security limitations. For example, excess material from which the lock body plates are stamped may result in additional manufacturing costs, particularly where the lock body has a non-rectangular horizontal cross section (such as a generally diamond shaped horizontal cross section, as is commonly used). These efficiency concerns may limit the shape and other external appearance characteristics of a laminated padlock. Also, exposed seams between the stacked plates may be subject to unauthorized attack or environmental corrosion or contamination, which may weaken, damage, or otherwise compromise the lock.

SUMMARY

In several described and illustrated embodiments of the present invention, various inventive features for padlocks and for methods of making padlocks are disclosed.

The present application contemplates a padlock with a laminated lock body formed from a stack of lock plates. The lock body may include one or more external fasteners having a side portion exposed along a side wall of the lock body. A series of lock plates may be manufactured such that an external web of material around each plate is not required. The present application also contemplates a sleeve for use with a padlock. A sleeve may provide support or protection for a lock body (which may, but need not, be a laminated lock body) with which the sleeve is assembled. The sleeve may be assembled with a lock body to alter the external appearance of the lock body. Still other features relating to lock bodies, padlock sleeves, and other lock components and manufacturing methods are contemplated in the present application, as described herein.

BRIEF DESCRIPTION OF THE DRAWINGS

Further features and advantages of the invention will become apparent from the following detailed description made with reference to the accompanying drawings, wherein.

DETAILED DESCRIPTION OF THE INVENTION

Figure 1:
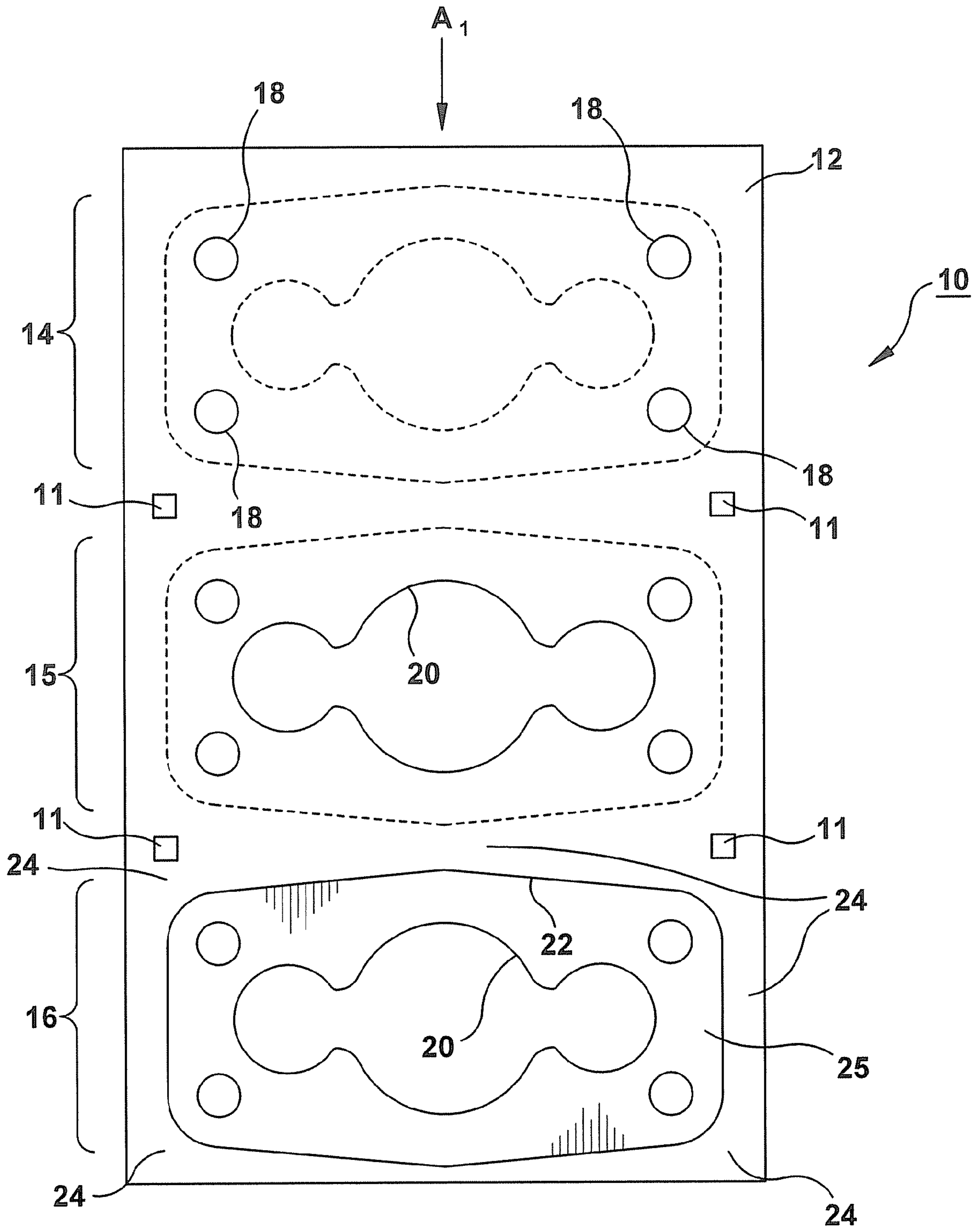
Fig. 1 (PRIOR ART)
FIG. 1 is a top view of a strip of material, showing a prior art stamping pattern for a series of lock plates within an external web.

This Detailed Description of the Invention merely describes embodiments of the invention and is not intended to limit the scope of the specification or claims in any way. Indeed, the invention as described is broader than and unlimited by the preferred embodiments, and the terms used have their full ordinary meaning.

The present application contemplates a padlock including one or more of the inventive features described herein, for example, to provide improved security, cost efficiency, or manufacturability. While the exemplary embodiments described in the specification and illustrated in the drawings relate to a laminated padlock having a body formed by securing a series of plates in a stack, it should be understood that many of the inventive features described herein may be applied to a wide variety of applications, including, for example, other types of lock bodies, and other types of padlocks.

Referring now to FIG. 1, an exemplary prior art stamping pattern 10 is shown utilizing an external web. The pattern 10 is designed for use with a progressive or sequential stamping operation. A strip 12 of material is fed in a direction $A_1$ through a stamping die (not shown). As illustrated, the stamping process yields plates over a span of approximately three locations or stages 14, 15, 16. Four corner cutouts 18 (for retaining lock body fasteners such as rivets) are stamped in a first portion of the strip at the first stage 14. A sequential second stage 15 stamps an internal cutout 20 into the first portion. The cutout 20 may combine with similar shaped cutouts in adjacent plates in a laminated stack to form internal cavities in the padlock body. An outer edge 22 of the plate 25 is stamped in the third stage 16, separating the plate 25 from the strip 12. Subsequent portions of the strip 12 undergo similar stamping operations to produce additional plates as the strip 12 is indexed through the stages 14, 15, 16. To index the strip for precision placement of the portions of the strip 12 to be stamped, a conveyor (not shown) engages registration points (for example, at webbing cutouts 11) on the surrounding webbing to advance the portion of the strip 12 to be stamped to the next stage in the stamping operation. As shown, webbing material 24 located on the outside of the edge 22 is excess material that is scrapped, adding to the cost of the plate manufacturing operations.

According to an inventive aspect of the present application, plates for a laminated lock body may be stamped or otherwise cut from a strip of material such that an excess web of material surrounding the plates is not produced, thereby reducing both material and machining costs. According to one inventive feature, rectangular lock body plates are formed from adjacent portions of a strip of material, such that no excess web material is disposed between adjacent plates prior to stamping or other such cutting operations. Further, in an exemplary arrangement, a single stamping or cutting operation separating first and second plates produces a finished edge of both first and second plates, thereby reducing machining costs. According to another inventive feature, a conveyor associated with the manufacturing equipment may be configured to engage a cutout in the first portion of the strip to precisely index the strip for subsequent cutting operations, thereby eliminating the need for a registration point on an external web of material for advancing the strip.

Figure 2:
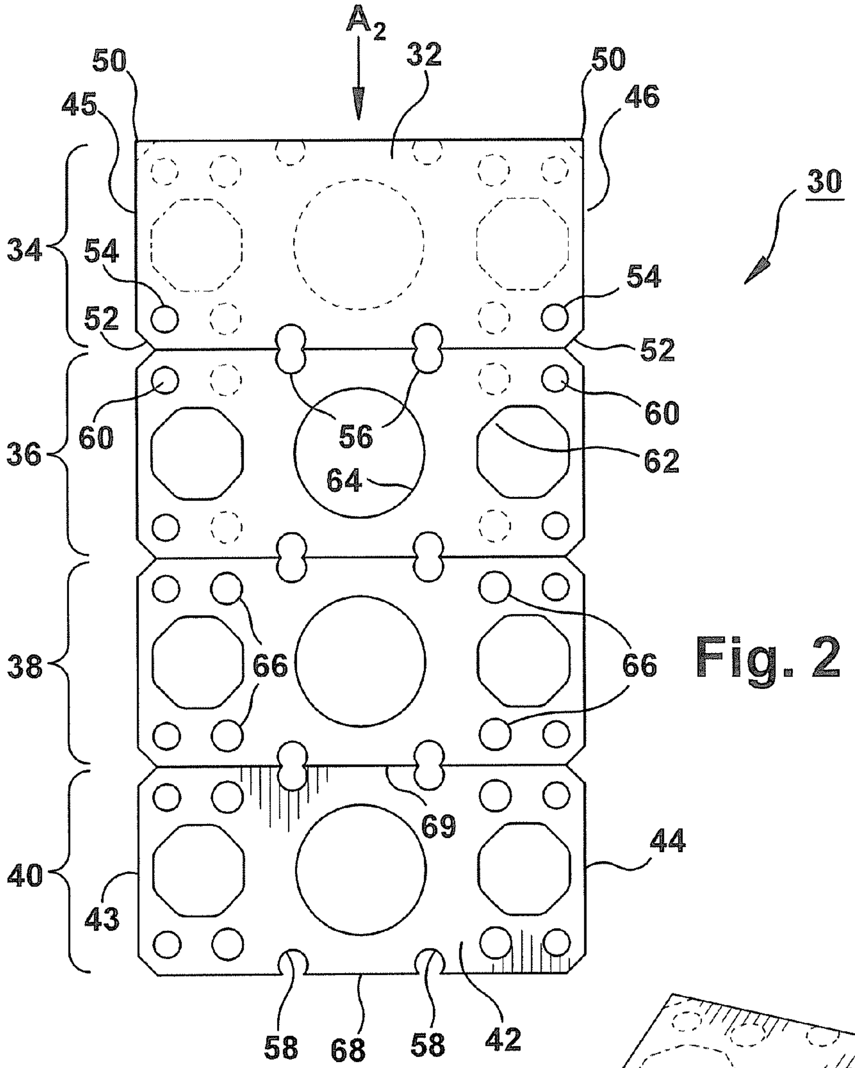
FIG. 2 is a top view of strip of material, showing a sequential stamping pattern for a series of lock plates.

A stamping pattern 30 in accordance with an embodiment of the present application is illustrated in FIG. 2. The exemplary pattern is imposed on a thin strip of material 32. The strip 32 may be provided, for example, in cold rolled steel (CRS), but other materials of suitable strength may be used in the practice of this invention, such as, for example, stainless steel. The width and thickness of the strip may vary in accordance with the lock size. The pattern 30 is designed for use in a series of sequential stamping operations. In use, the strip 32 of material may be fed in a direction $A_2$ through a stamping die (not shown) or other such cutting operation.

Figure 3:
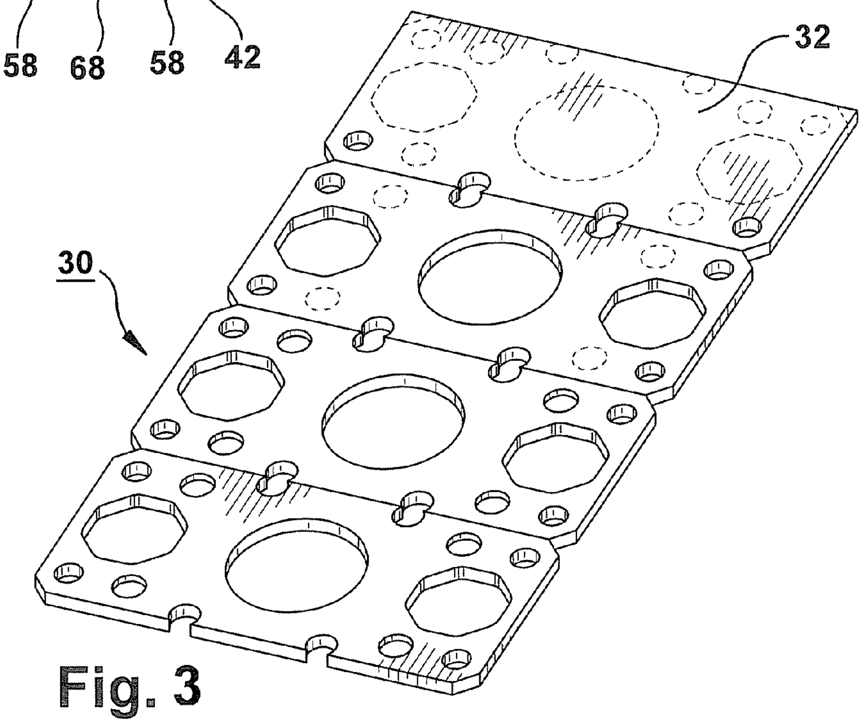
FIG. 3 is a perspective view of the strip of material of FIG. 2.

The exemplary pattern 30 in FIG. 2 is shown as being produced in four distinct stages of stamping 34, 36, 38, 40, although the order of stamping operations and number of stages may be varied. Each stage is designed to perform a series of certain stamping functions on a plate portion 41, culminating in the forming of a plate 42. In the illustrated embodiment, the exterior edges 43, 44 of the finished plate 42 are the same as the exterior edges 45, 46 of the beginning strip 32, eliminating the need for a cutting operation to prepare side edges of the plate 42. A perspective view of the strip of material 32 is shown in FIG. 3. It should be understood by others with ordinary skill in the art that the distinct stamping pattern shown is for exemplary purposes only, and that other patterns may be used in the practice of the present invention.

As shown in the first stage 34 of the illustrated arrangement, cutting operations may include removal of corner portions 50 of adjacent plate portions to form an angled "v" shaped notch or edge 52. The edge 52 can be used as a registration point, to be engaged by a conveyor for indexing the portion of material to subsequent stages 36, 38, 40. The edge 52 can be used to precisely position the plate portion of strip material 32 to be stamped during stamping. The edges 52 may additionally or alternatively be used to properly position the stacked plates during assembly of a lock body.

As also shown in the first stage 34 of the illustrated arrangement, one or more fastener cutouts 54 may be formed in the first stage 34. The cutouts 54 may be sized to accept conventional fasteners, such as for example, bolts or rivets, used to fasten or clamp the individual plates 42 together after stamping to form a lock body. Additionally or alternatively, these cutouts 54 may be used as registration points for indexing and positioning the plate portions in subsequent machining stages.

As also shown in the first stage 34 of the illustrated arrangement, one or more internally located figure "8" shaped apertures 56 may additionally or alternatively be stamped to intersect a lateral axis separating plate portions of the strip 32. When the plate portions are separated to form plates 42, the apertures 56 are bisected to form cutouts 58 along the edges of the plates 42. As with the other cutouts described above, one or more of these cutouts 56 may additionally or alternatively be used as registration points for indexing and positioning the plate portions in subsequent machining stages.

As shown in the second stage 36 of the exemplary manufacturing process, two additional fastener cutouts 60 may be formed. As with the other cutouts described above, one or more of these cutouts 60 may additionally or alternatively be used as registration points for indexing and positioning the plate portions in subsequent machining stages.

As also shown in the second stage 36 of the illustrated arrangement, lock cavity cutouts may be formed, which may include, for example, cutouts for accommodating the lock cylinder, shackle, and or internal locking mechanism. In the illustrated arrangement, two shackle cutouts 62 are stamped on either side of a center cutout 64. The shackle cutouts 62 combine with cutouts in adjacent laminated plates to form passageways for a shackle, while the center cutout 64 combines with cutouts in adjacent laminated plates to form an internal lock cavity for the locking mechanism. As with the other cutouts described above, one or more of these cutouts 62, 64 may additionally or alternatively be used as registration points for indexing and positioning the plate portions in subsequent machining stages.

Still referring to FIG. 2, a third stage 38 may include the formation of four alignment recesses 66. The alignment recesses 66 may be formed as cutouts, as shown in the plate 82 of FIG. 6*b*, or as indentations, similar to the indentations of the plates 84, 86, 88, 90, 92 (see FIGS. 9*b*, 10*b*, 11*b*, 12*b*, 13*b*). The recesses 66 may provide gripping points that can be used to properly position the strip material 32 during stamping, serving as registration points similar to the use of the cutouts described above. Additionally or alternatively, nibs 99 formed in an adjacent plate 84 (see FIG. 7*b*) may interlock with the recesses 66 of the plate 82 to assist in aligning the plates during assembly of a lock body. Another cutting operation, shown in the fourth stage 40 of the exemplary arrangement, separates a finished plate 42 from the strip material 32 along a straight edge 68. The next plate in series is separated from the strip along a straight edge 69. As shown, the edges 68, 69 are linear and parallel.

Plates formed by the exemplary process described are rectangular shaped and of uniform length and width. Although the internal pattern formed on each plate by the active and inactive punches may vary, in one embodiment, the exterior edges of each plate may be essentially the same.

Figure 4:
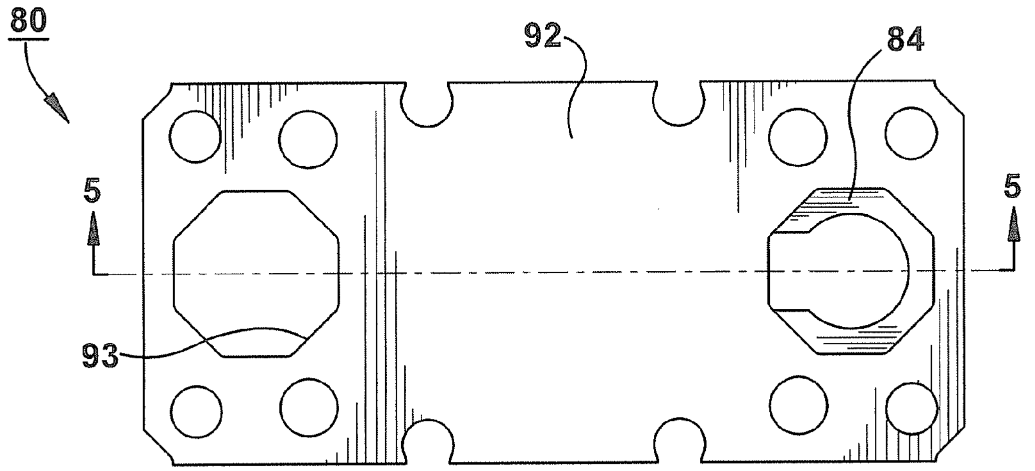
FIG. 4 is a top view of a stack of lock plates forming a lock body.
Figure 5:
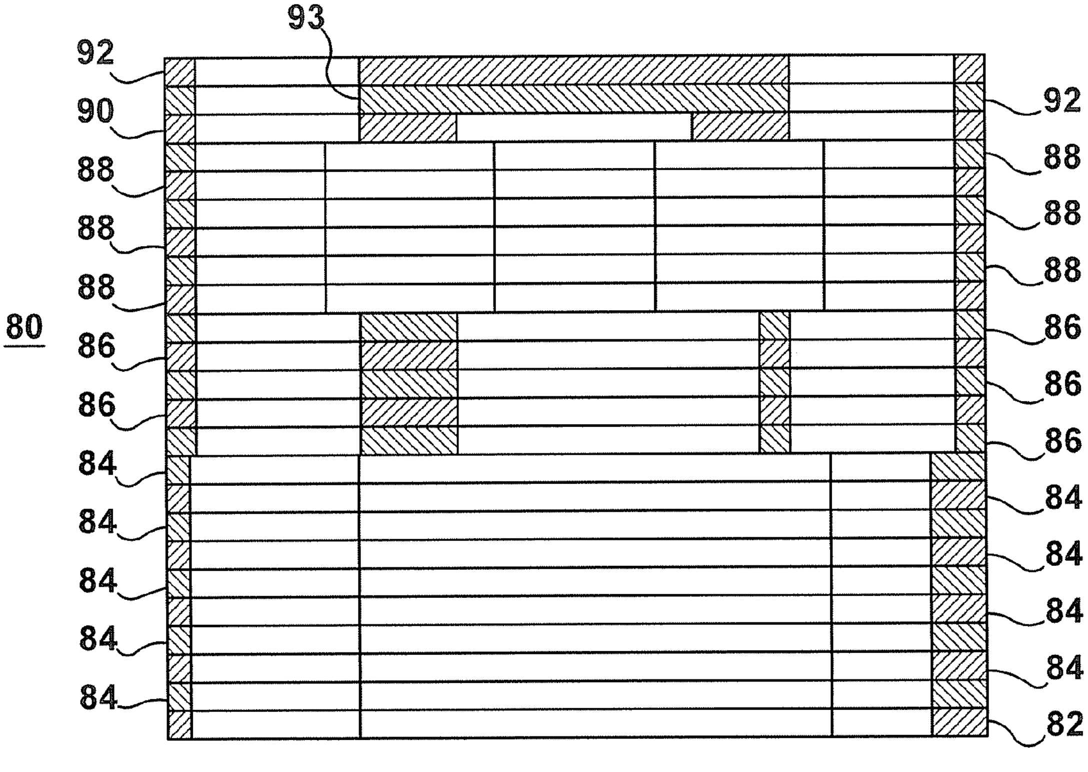
FIG. 5 is a cross-sectional view of the stack of FIG. 4, shown along the lines 5-5 of FIG. 4.

Referring now to FIG. 4, a top view of an exemplary stack 80 of laminated plates according to an embodiment of the present application is shown. A cross-sectional view of the stack is shown in FIG. 5 as seen along the lines 5-5 of FIG. 4. The exemplary laminated stack 80 is formed of six different types of plates 82, 84, 86, 88, 90, 92 combining total 24 plates in all. FIGS. 6*a*-11*b* illustrated the plates 82, 84, 86, 88, 90, 92 in additional detail. The plates 82, 84, 86, 88, 90, 92 in combination form cavities within the stack 80. Each cavity may accommodate one or more of various mechanical components of the padlock, such as, for example, a shackle, key cylinder, or locking mechanism.

Figure 6A:
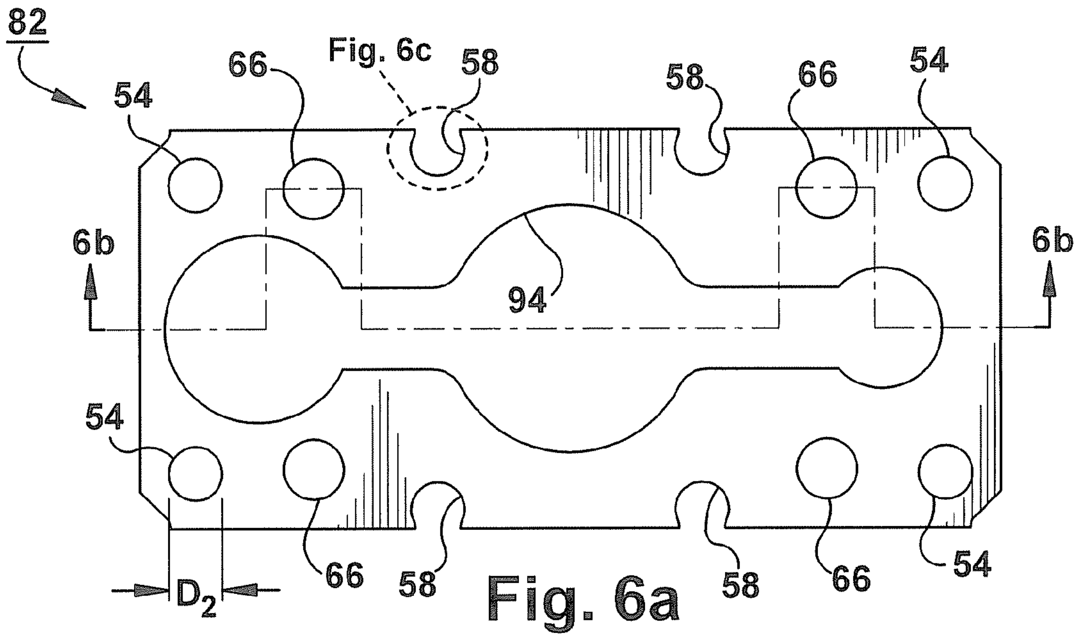
FIG. 6*a* is a top view of a lock plate.
Figure 6B:
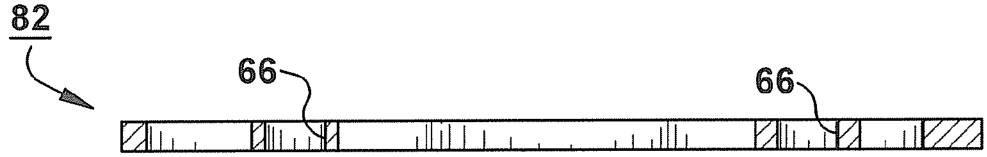
FIG. 6*b* is a cross-sectional view of the plate of FIG. 6*a*, shown along the lines 6*b*-6*b* of FIG. 6*a;*
Figure 6C:
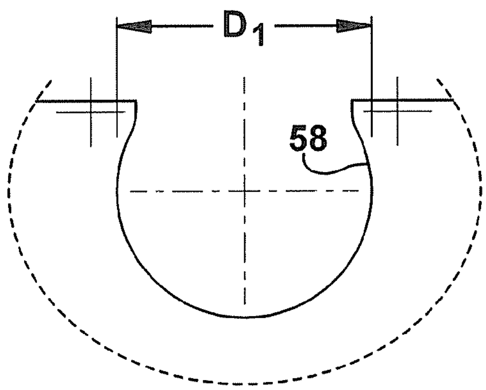
FIG. 6*c* is a detailed view of a portion of FIG. 6*a* within the circle so designated, showing an external cutout.
Figure 28:
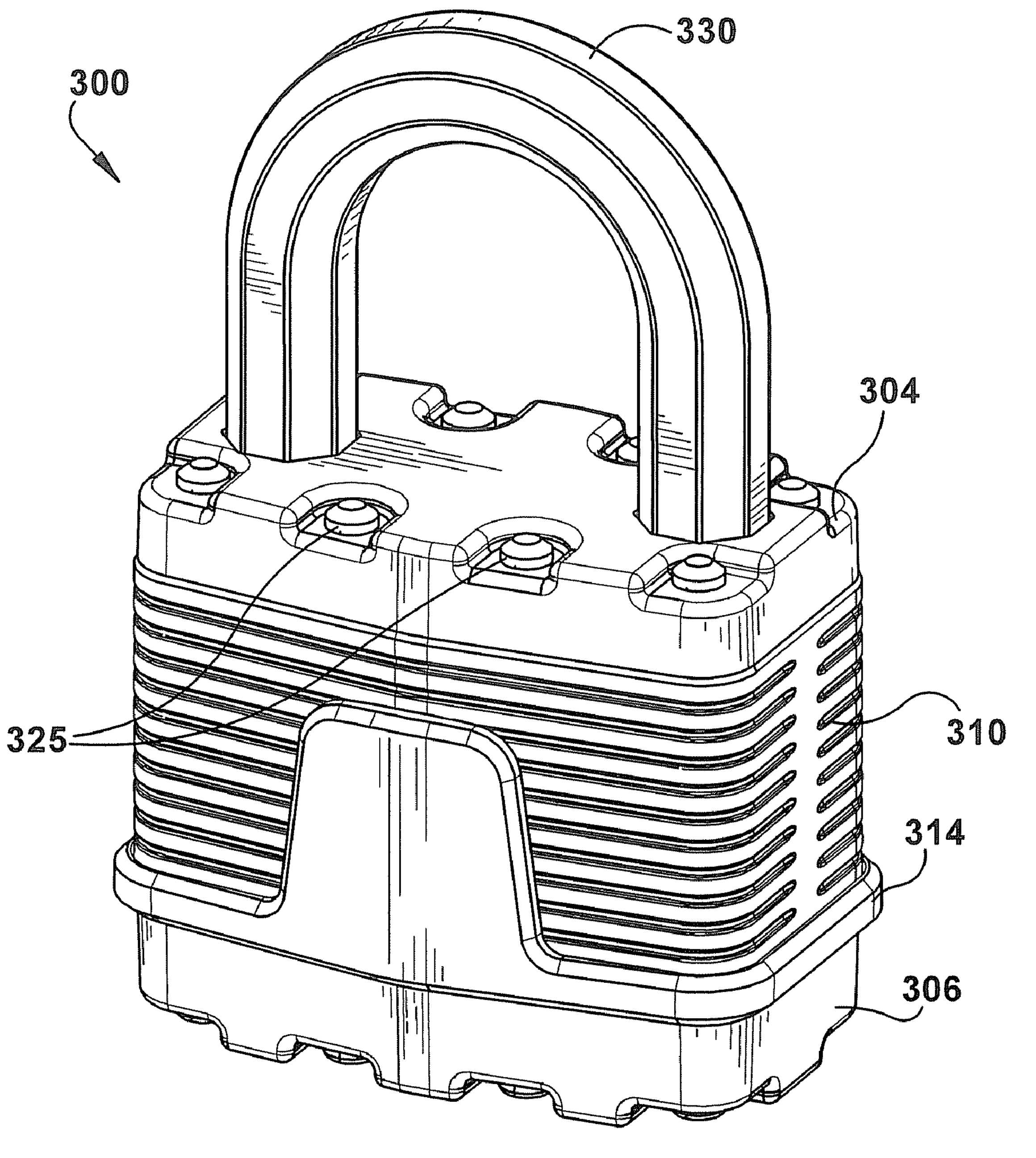
FIG. 28 is a rear perspective view of a padlock.

In the exemplary stack 80, a bottommost plate 82 accommodates a shackle spring and a bottom portion of a lock cylinder housing (see FIG. 28). FIG. 6*a* is a top view of the plate 82 and FIG. 6*b* is a cross sectional view shown along the lines 6*b*-6*b* of FIG. 6*a*. The outer edge of the plate includes four fastener cutouts 58 sized to partially surround the circumference of a rivet. FIG. 6*c* is a detailed view of one fastener cutout 58. As shown, the edge of the cutout 58 surrounds the rivet more than 180° around its circumference, such as, for example, by 200°. The shape of the cutout 58 may provide support to the rivet. Additional support may be provided by a sleeve, to be discussed later in more detail.

The fastener cutout 58 may vary in shape and size in the practice of the invention. In the illustrated embodiment, the external fastener cutout 58 has a diameter $D_1$ that is slightly oversized relative to a diameter of the rivet, such as for example, a 0.109" diameter cutout and 0.104" diameter rivet, allowing the rivet to expand during assembly of the lock body without damaging the plates. However, the mouth of the cutout 58 has a width less than a diameter of the rivet. As such, the resulting containment forces caused when the rivet is inserted through the plates 82, 84, 86, 88, 90, 92 increases the strength of the laminated stack 80.

Referring again to FIG. 6*a*, the plate 82 includes other cutouts. Four interior fastener cutouts 54 are located near the corners of the plate 82. The interior fastener cutouts 54 are sized to allow the insertion of a rivet or other such fastener. The cutouts 54 are stamped with a diameter $D_2$ that may allow for a small clearance with a rivet, allowing the rivet to expand during assembly. Four recesses 66 are also included. The recesses 66 may be cutouts (as shown in FIG. 6*b*) or they may be indentations stamped in the plate 82, producing both a recess and a nib (as shown, for example, in FIG. 7*b*). As discussed above, these indentations 66 can be used during the process to aid in stamping or stacking. A centrally located aperture 94 is stamped in the exemplary plate 82 to accommodate at least a portion of a cylinder housing.

Figure 7A:
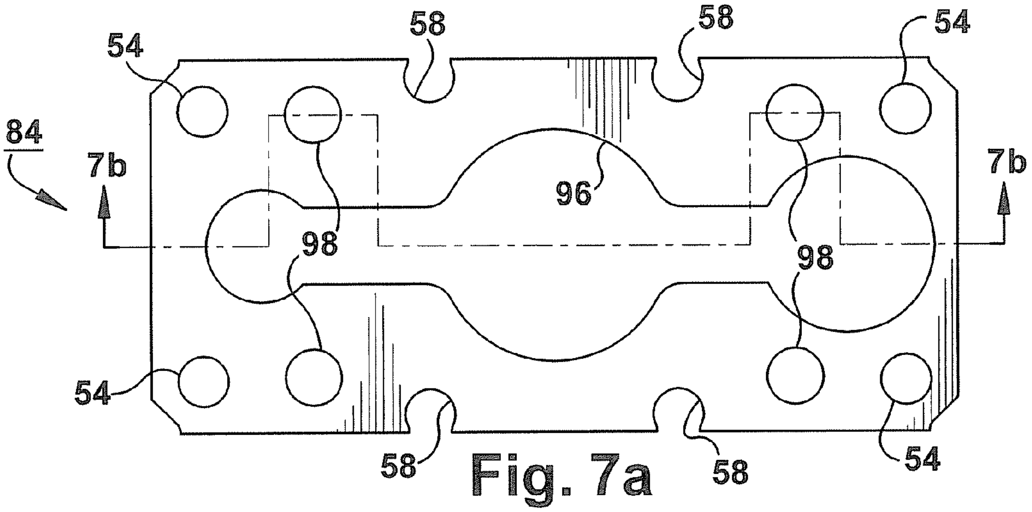
FIG. 7*a* is a top view of another lock plate.

An exemplary plate 84 used to form a cavity sized to accommodate a lock cylinder housing and shackle leg is illustrated in FIG. 7*a*. The exemplary plate 84 includes a cutout 96 sized to combine with similarly shaped cutouts in adjacent plates to form a suitable cavity. As shown in FIG. 5, the exemplary lock body stack 80 includes a total of nine plates of this pattern. Similar to the plate 82 previously discussed, the plate 84 includes four external fastener cutouts 58 and four interior fastener cutouts 54. Although the cutouts 54, 58 are illustrated as being of uniform size, shape, and location within a stack 80, the cutouts 54, 58 can vary in size, shape, and location, for example, to accommodate different sized lock bodies or different fastener arrangements.

Figure 7B:
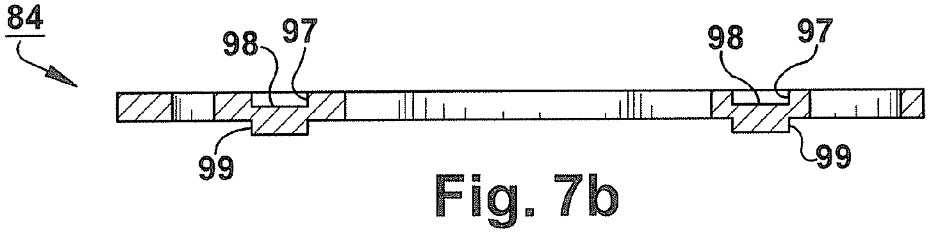
FIG. 7*b* is a cross-sectional view of the plate of FIG. 7*a*, shown along the lines 7*b*-7*b* of FIG. 7*a;*

A cross-sectional view of the plate 84 is shown in FIG. 7*b*. As shown, the plate 84 may include indentations 98 including a recess 97 on a first side of the plate 84 and a nib 99 on an opposite side of the plate 84. As discussed above, the indentations 98 may facilitate indexing of the plate portions during manufacturing or alignment of the plates during assembly of the stack 80.

Figure 8A:
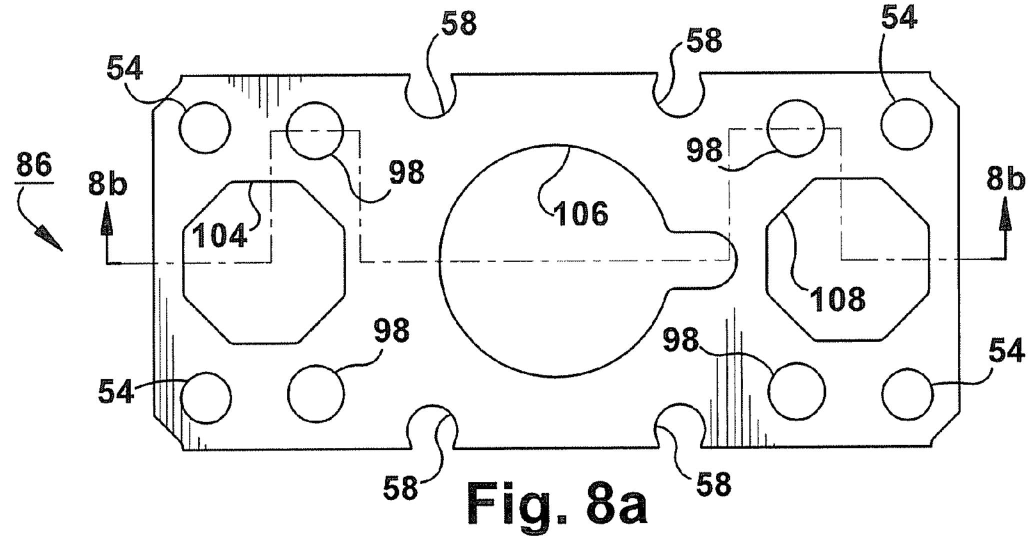
FIG. 8*a* is a top view of yet another lock plate.
Figure 8B:
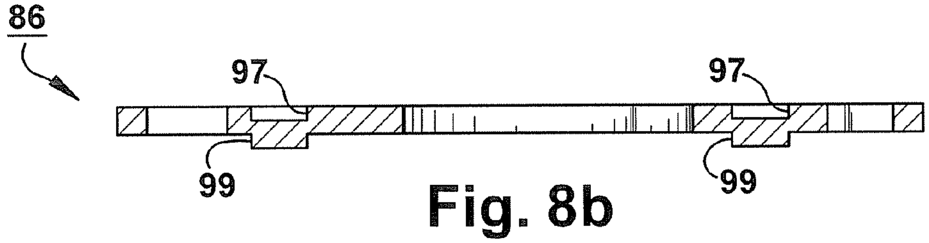
FIG. 8*b* is a cross-sectional view of the plate of FIG. 8*a*, shown along the lines 8*b*-8*b* of FIG. 8*a;*

An exemplary plate 86 used to form cavities sized to accommodate an extension, an extension spring, and shackle legs is illustrated in FIG. 8*a*. The plate 86 includes several cutouts 104, 106, 108 sized to combine with same shaped cutouts in adjacent plates to form a suitable cavities. For example, cutouts 104, 108 are sized to form passageways for shackle legs. As shown in FIG. 5, the exemplary lock body stack 80 includes a total of five plates 86 of this pattern. Similar to the plates 82, 84 previously discussed, the plate 84 includes four external fastener cutouts 58, four interior fastener cutouts 54, and four indentations 98. A cross-sectional view of the plate 86 is shown in FIG. 8*b*.

Figure 9A:
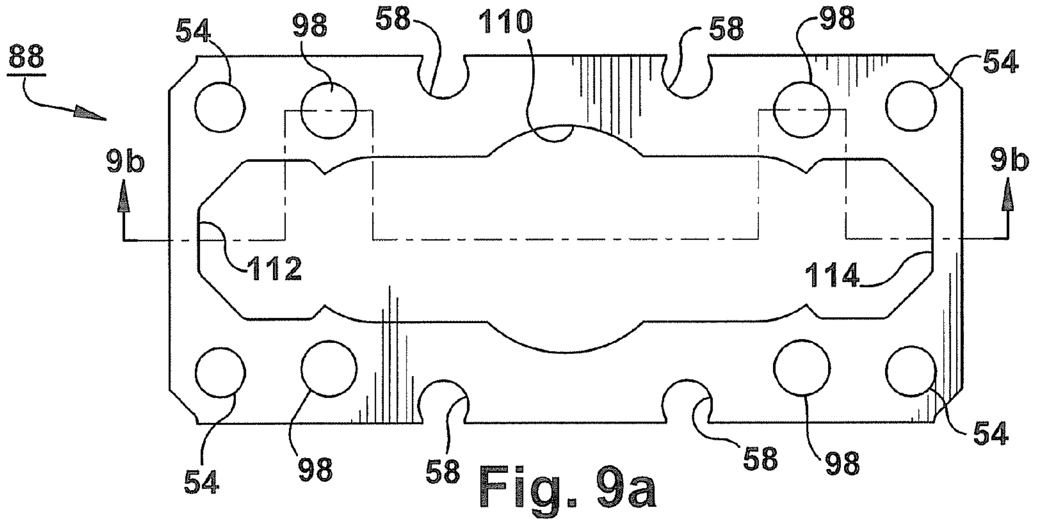
FIG. 9*a* is a top view of yet another lock plate.
Figure 9B:
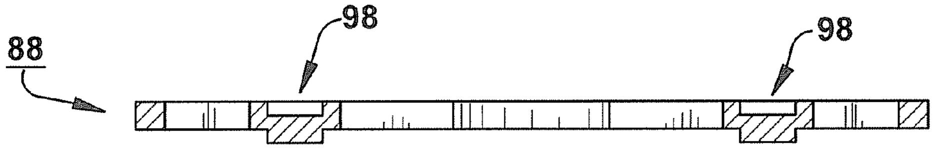
FIG. 9*b* is a cross-sectional view of the plate of FIG. 9*a*, shown along the lines 9*b*-9*b* of FIG. 9*a;*

An exemplary plate 88 used to form a cavity sized to accommodate an extension, ball bearings, and shackle legs is illustrated in FIG. 9*a*. The plate 86 includes a cutout 110 sized to combine with other cutouts in adjacent plates to form a cavity suitable to accommodate the padlock components. For example, outer portions of the cutout 110 define edges 112, 114 sized to form passageways for shackle legs. As shown in FIG. 5, the exemplary lock body stack 80 includes a total of six plates 88 of this pattern. Similar to the plates 82, 84, 86 previously discussed, the plate 88 includes four external fastener cutouts 58, four interior fastener cutouts , and four indentations 98. A cross-sectional view of the plate 88 is shown in FIG. 9*b*.

Figure 10A:
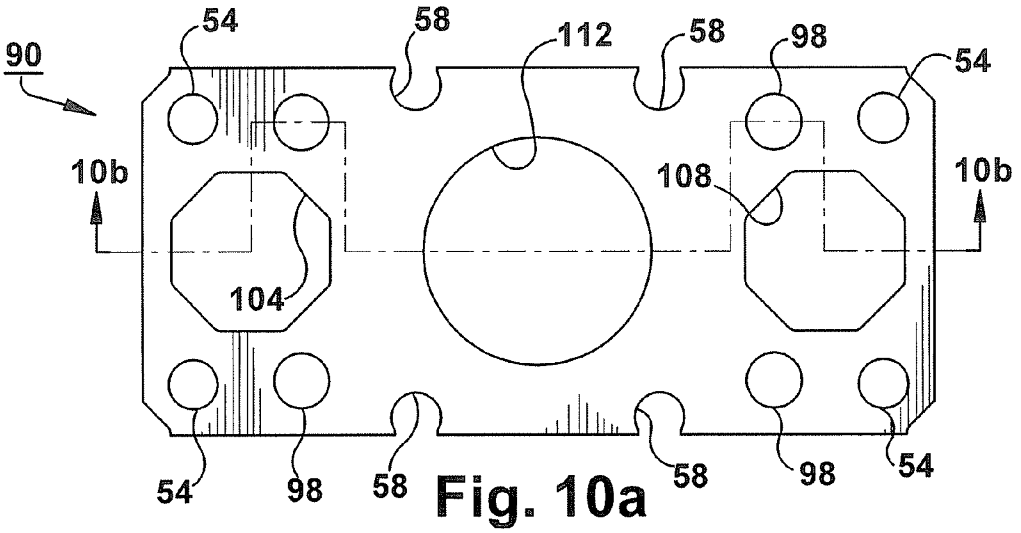
FIG. 10*a* is a top view of still another lock plate.
Figure 10B:
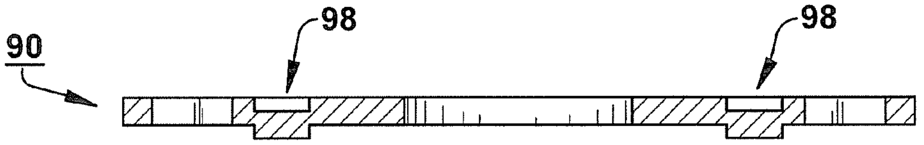
FIG. 10*b* is a cross-sectional view of the plate of FIG. 10*a*, shown along the lines 10*b*-10*b* of FIG. 10*a;*
Figure 11A:
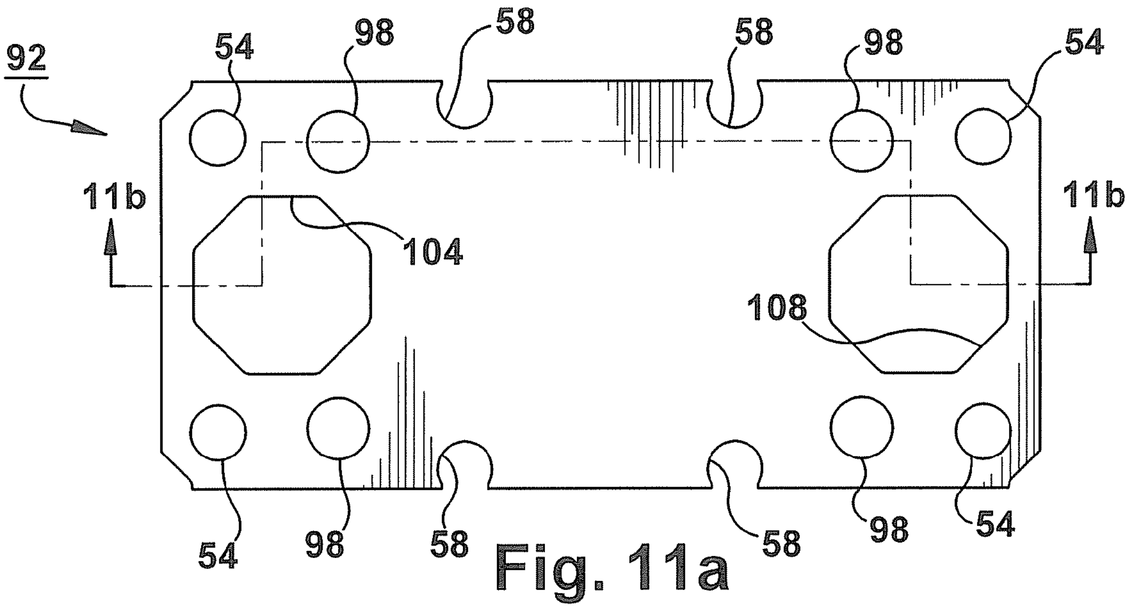
FIG. 11*a* is a top view of another lock plate.
Figure 11B:
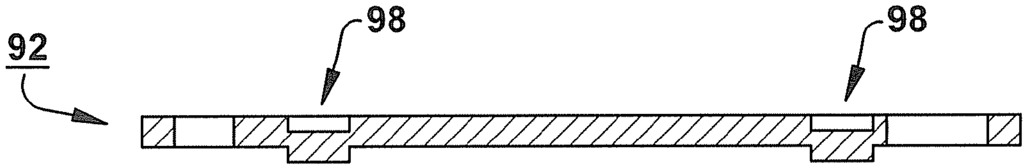
FIG. 11*b* is a cross-sectional view of the plate of FIG. 11*a*, shown along the lines 11*b*-11*b* of FIG. 11*a;*

Two additional plate patterns 90, 92 are shown in FIGS. 10*a*-*b* and 11*a*-*b*. The plate 90 forms a cavity to accommodate portions of an extension and shackle legs (see FIG. 28). As shown in FIG. 5, the exemplary lock body stack 80 includes one plate 90 of this pattern. An upper portion of the exemplary lock body stack 80 includes two top plates 92, which form cavities to accommodate the shackle legs (see FIG. 28). In addition to cutouts 104, 108 for accommodating shackle legs, each plate 90, 92 also includes four external fastener cutouts, four interior fastener cutouts, and four indentations 98. In addition, plate 90 includes a center cutout 112. Cross-sectional views of the plates 90, 92 are illustrated in FIGS. 10*b* and 11*b*, respectively.

The plates 82, 84, 86, 88, 90, 92 of the exemplary embodiment may be mass produced in many different quantities, varieties, orders, or arrangements. In one embodiment, each type of plate is mass produced sequentially on appropriate manufacturing equipment, for example, by producing a large quantity of a first plate 82, then producing a large quantity of a second plate 84, and so forth. The various plates may then be separated, sorted, and combined in the desired order to produce a lock body. In another embodiment, a series of lock body plates combinable to form a laminated lock body may be produced sequentially, such that upon stamping or cutting the series of plates, the plates may be stacked for formation of a lock body, thereby eliminating the need to separate, sort, and properly orient the plates in subsequent assembly procedures. In an exemplary process, dies used to stamp the internal and/or external features of the plates may include punches that can be made inactive or active to vary the pattern of cutouts produced in a plate portion. For example, a combination of punches may be used to stamp a plate having a first distinct pattern, and a different combination of punches may be used to stamp a sequential plate (i.e., the next plate in a lock body stack) having a second distinct pattern. As a result, a laminated stack having a plurality of different plate designs may be manufactured, for example, from one strip of material in series using a single piece of manufacturing equipment. As a result, in an exemplary embodiment of the application, plates may be produced, without interruption for retooling, having different internal cutout patterns in any sequence required to accommodate the internal components of a lock. As such, in an exemplary plate manufacturing process, manufacturing equipment may produce, in sequence, one plate 82 of a first pattern, nine plates 84 of a second pattern, five plates 86 of a third pattern, six plates 88 of a fourth pattern, one plate 90 of a fifth pattern, and two plates 92 of a sixth pattern, which may be stacked immediately upon formation for assembly of a lock body.

Figure 12:
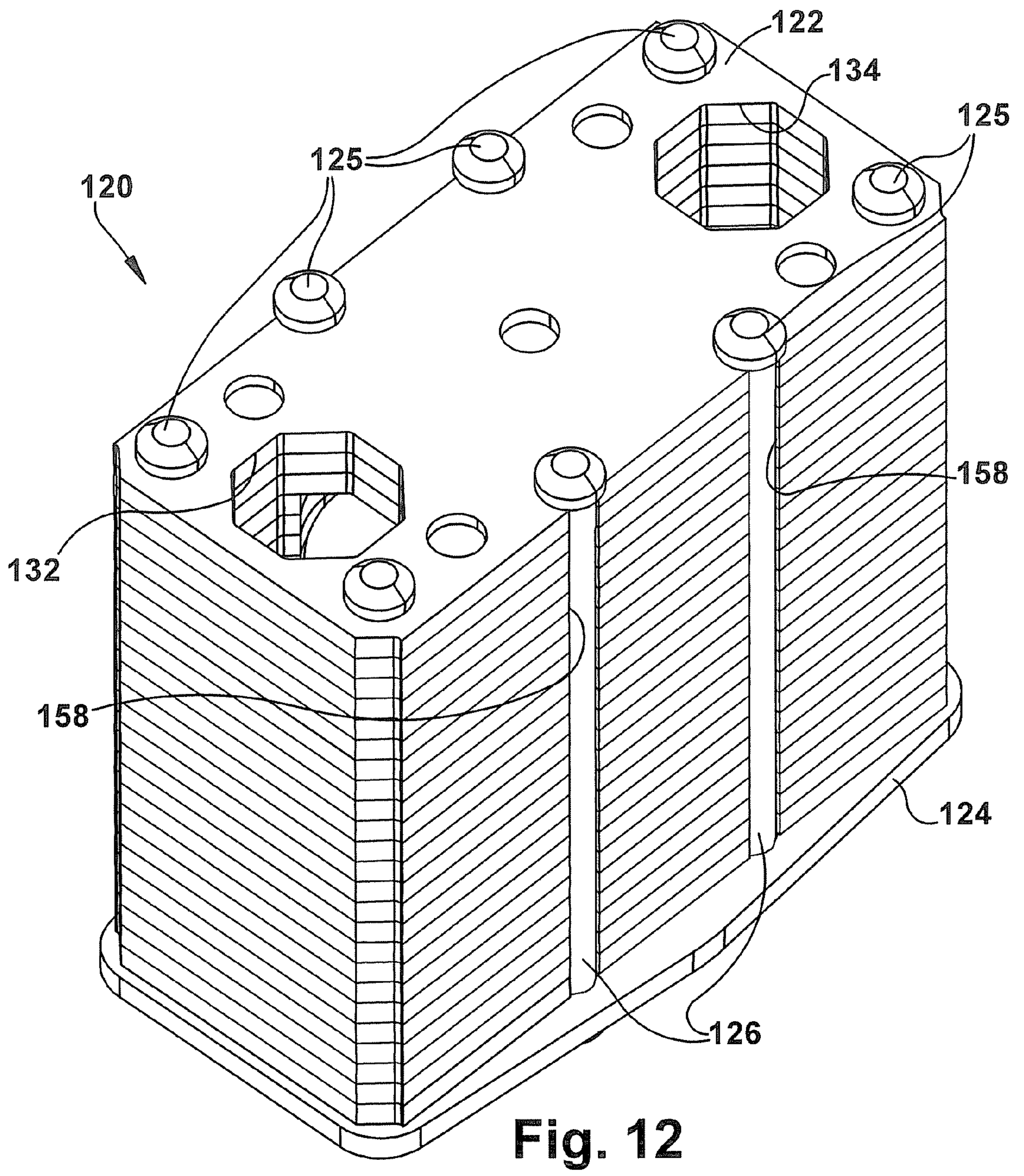
FIG. 12 is an upper perspective view of a lock body having internal and external fasteners.
Figure 13:
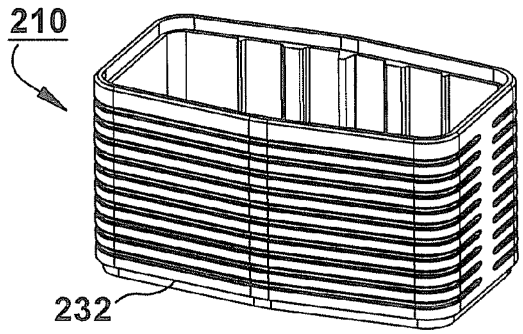
FIG. 13 is a front perspective view of a sleeve for a padlock body.
Figure 14:
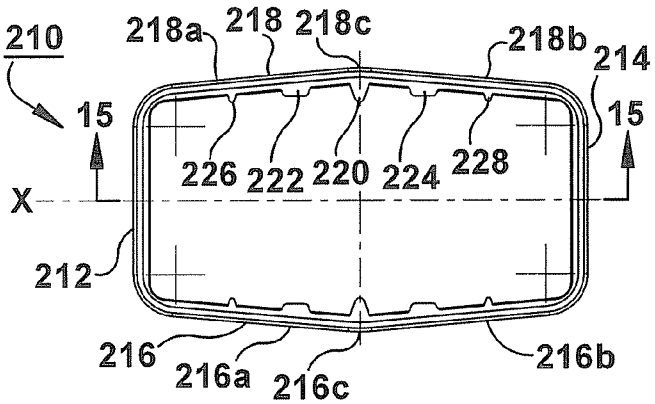
FIG. 14 is a top view of the lock sleeve of FIG. 13.

In assembling the exemplary lock body, the plates 82, 84, 86, 88, 90, 92 are stacked as shown in FIG. 5, and fasteners, such as bolts or rivets 125, may be inserted through the aligned fastener cutouts 54, 58 to secure the plates as a stack (see, for example, the lock body 120 of FIG. 12). As shown in FIG. 12, side portions 126 of rivets 125 inserted through external fastener cutouts 58 are exposed along longitudinally extending front and rear sides of the lock body 120. By providing a staggered fastener arrangement as shown, with both interior and externally exposed fasteners, compression of the stack of plates by the fasteners 125 may be more uniform, limiting the gaps (or "spread") between plates at the outer edges. This may reduce susceptibility to tampering, corrosive attack, or other such risks of compromise of the lock.

To provide additional support for the external fastener, the external fastener cutout 58 may surround more than 180° of the circumference of the external fastener 125 (for example, with cutout edge surrounding approximately 200° of the circumference of the fastener 125), as described above. According to another inventive aspect of the present application, a lock body having one or more externally exposed fasteners may be provided with a sleeve surrounding at least a portion of the lock body, such that the exposed side portion is supported against, for example, bowing or buckling forces, and/or to protect the exposed fastener from vulnerability to tampering, corrosive attack, or other such conditions. Additionally or alternatively, a sleeve may be provided that surrounds the lock body to alter the external shape of the lock, to provide a lock that utilizes less material, or for other such benefits, as will be described in greater detail below.

Many different types and forms of sleeves may be utilized for assembly over a lock body. In one embodiment, a sleeve may include an inner surface sized to engage or contact the lock body around the entire perimeter of the lock body, such that no gaps are provided between the lock body and the sleeve. In other embodiments, a sleeve may be provided with an inner surface having one or more lock body engaging protrusions, such that one or more gaps are disposed between the lock body and the sleeve. This arrangement may allow for less exacting tolerances between the lock body and the internal dimensions of the sleeve. Additionally or alternatively, such an arrangement may allow for reduced material use (and with it, reduced costs and/or reduced weight of the lock). As still another benefit, the gaps may form cavities for containing (i.e., being either partially or completely filled with) various materials, such as, for example, a foam or other such sealant to provide environmental protection to the lock components, or a tamper indicator solution or fluid, which may leak from the sleeve and end cap enclosure if the enclosure is compromised.

In one embodiment, internal protrusions on a sleeve are positioned to engage external fasteners of the lock to provide additional support for the external fasteners. To provide secure engagement between the lock body and sleeve, protrusions of varying heights may extend from the internal surface of the sleeve to properly and uniformly engage discrete locations on the external surface of the lock body. In the case of a lock body having a substantially flat external surface, protrusions of varying heights extending from a non-flat or contoured inner surface of a sleeve may provide a uniform plane of engagement with the lock body surface.

As another inventive feature, a sleeve or case may be provided in a shape differing from that of the lock body with which the sleeve or case is to be assembled, allowing for customization of the exterior shape and size of a padlock. The sleeve or case may surround the lock body. By adjusting the size or shape of the sleeve and the rib pattern and rib size, a standard lamination plate stack may be used with a variety of different padlocks. As a result, the geometry of the sleeve can vary without varying the geometry of the internal lock body. This customization includes many variations, such as, for example, variations in size, shape, branding and style. The standardization of the plate assembly also reduces tool and production costs. Further, the sleeve effectively covers any variation in lamination die breaks and offers a consistent lamination appearance to the exterior of the lock.

FIGS. 13-17 illustrate an exemplary sleeve 210 for a lock body, such as, for example, the lock body 120 of FIG. 12. The exemplary sleeve 210 is generally rectangular shaped with an open top and bottom for receipt of a generally rectangular shaped lock body. The exemplary sleeve has two parallel end walls 212, 214 and two longer side walls 216, 218. The longer walls 216, 218 include two separate angled planar sections, 216*a*, 216*b* and 218*a*, 218*b*, respectively, that join at a center point, 216*c*, 218*c*, respectively, to form a generally diamond shaped cross section. The shape, size, and orientation of the sleeve and the sleeve walls illustrated is for exemplary purposes only, and many shapes, sizes, and orientation combinations may be utilized in the practice of this invention.

The sleeve 210 is designed to provide protection for and/or support to a lock body and the components of the lock body. While the sleeve may be sized to closely fit a lock body, contacting the lock body around its entire perimeter, in another embodiment, protrusions on an internal surface of the sleeve engage the side walls of the lock body. Many different types of protrusions may be used. In the illustrated embodiment, the sleeve 210 includes a series of vertical ribs 220, 222, 224, 226, 228 protruding from the inside of two opposing walls 216, 218. In the exemplary embodiment, the internal sides of the walls 216, 218 are mirror images of each other and therefore, only the ribs on one wall 218 will be discussed in detail.

Figure 15:
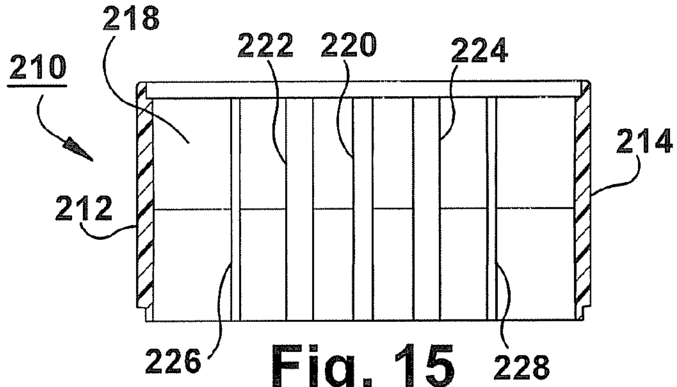
FIG. 15 is a cross-sectional view of the lock sleeve of FIG. 13, shown along the lines 15-15 of FIG. 14.

The internal side of wall 218 includes a center rib 220 protruding toward the opposing wall 216. The center rib 220 is located at a mid-point of the length of the wall. On either side of the center rib are two intermediate ribs 222, 224. In the illustrated embodiment, the intermediate ribs 222, 224 are of a lesser height than the center rib 220, for engagement of external fasteners protruding from the sides of the lock body (see FIG. 17). Outward of the two intermediate ribs 222, 224 are two outer ribs 226, 228. As shown, the outer ribs 226, 228 may be of a lesser height than the center rib 220, sized such that the endpoints of the ribs 220, 226, 228 are essentially tangent to an axis parallel to a longitudinal axis $A_1$ of the sleeve, to allow for uniform engagement of a generally flat lock body side wall. Referring now to FIG. 15, a cross-sectional view of the lock sleeve 210 is shown along the lines 15-15 of FIG. 14. The vertical ribs 226, 222, 220, 224, 228 are illustrated on the inside of the side wall 218. It should be understood by those with ordinary skill in the art that many different shapes, lengths, positions, or numbers of protrusions may can be utilized in the practice of the present invention.

Figure 16:
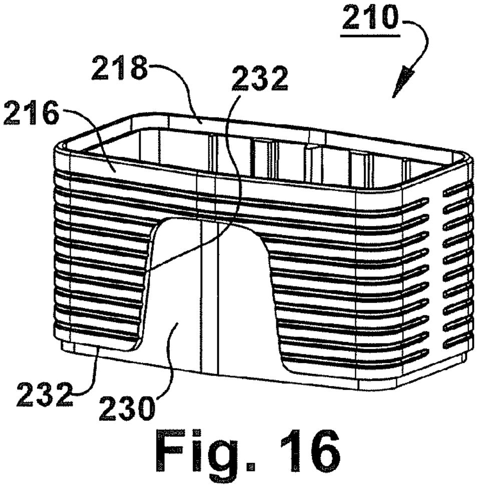
FIG. 16 is a rear perspective view of the lock sleeve of FIG. 13.

The rear view of the exemplary lock sleeve 210 is shown in FIG. 16. A decorative lamination pattern is formed on a portion of the outside of the sleeve 210. The outside surface of one side wall 216 includes an indent portion 230 defined by a ridge 232. In the exemplary sleeve shown, the indent is sized to accommodate a plastic bumper that is press fit onto the sleeve. The bumper may protect the lock from damage by dampening impact from dropping or other forces. It should be understood that the pattern of the ridge 232 may vary in the practice of the present invention, and neither a bumper nor a lamination pattern is necessary in the practice of this invention.

The sleeve may be manufactured by various techniques and may comprise one or more of many different materials, such as, for example, zinc, steel, steel with plating, stainless steel, plastic, a powdered metal/sintered stainless steel, or aluminum. These exemplary materials and other suitable materials may offer various benefits relating to material strength, corrosion resistance, aesthetics, manufacturability, cost efficiency, and other such properties.

Figure 17:
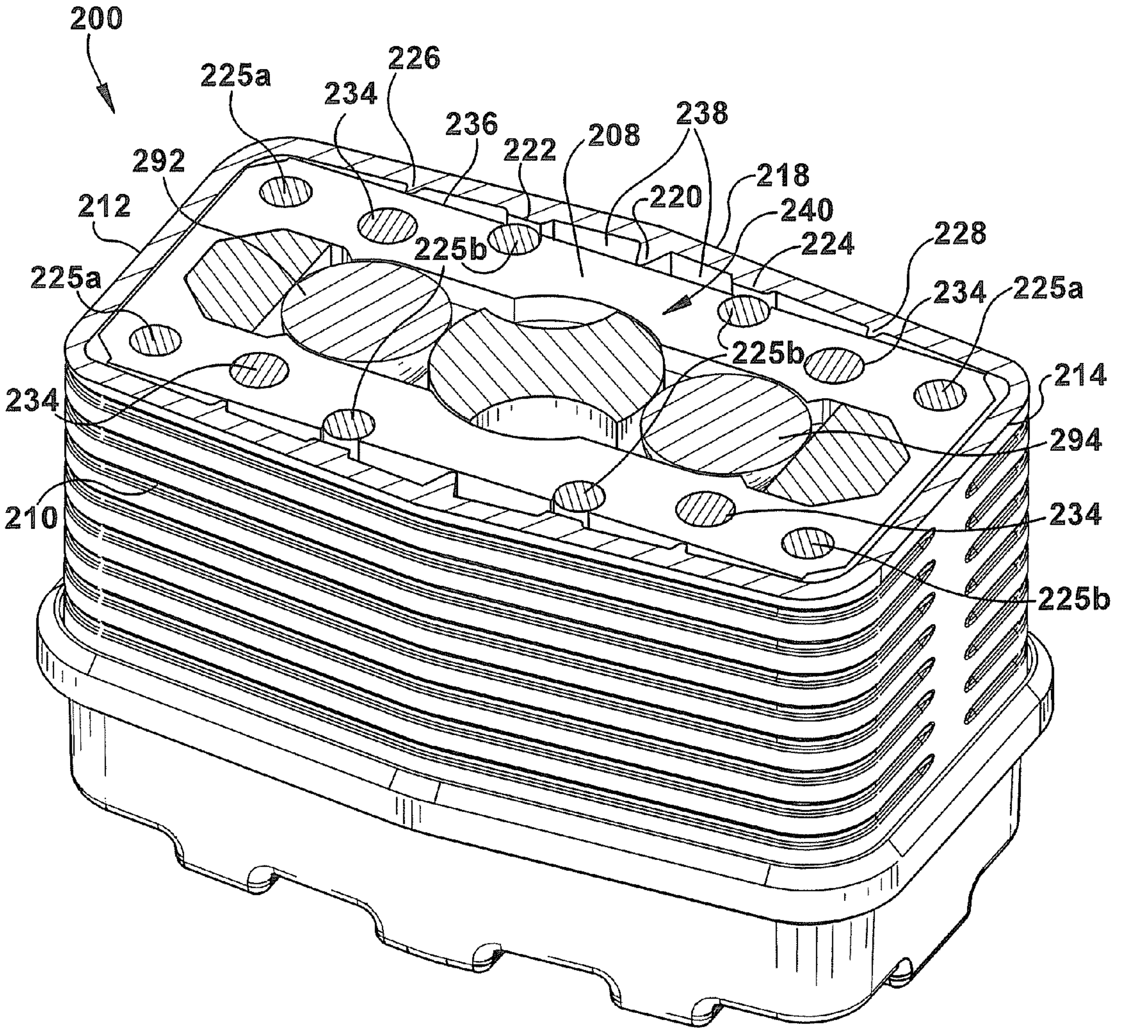
FIG. 17 is a cross-sectional perspective view of a padlock including the lock sleeve of FIG. 13.
Figure 18:
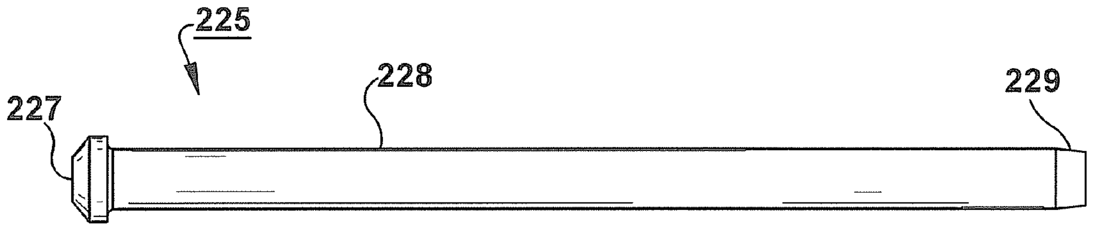
FIG. 18 is a side view of a rivet for use with a padlock body.
Figure 19:
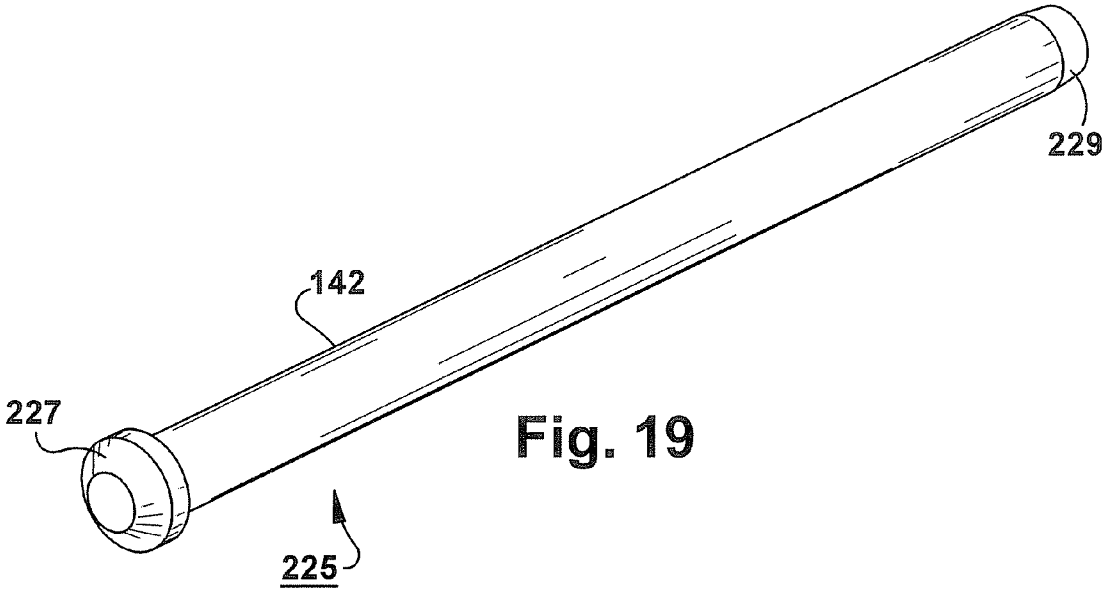
FIG. 19 is a perspective view of the rivet of FIG. 18.

Referring now to FIG. 17, a perspective view, partially in section, is shown of a portion of the padlock 200. The section view is taken from a point in the lock body 240 through the ball bearings 292, 294. A lamination plate 208 is shown within the sleeve 210. The exemplary plate 208 includes indentations 298 used to maintain the stack in proper position during a punching operation. The stack of plates are secured together by a series of rivets 225*a*, 225*b*. Specifically, four interior rivets 225*a* are located near the four corners of the lock body 240. Four additional external rivets 225*b* are inserted through apertures that are open to exterior edges 236 of the plate. It should be understood that any number of rivets, or rivet locations can be used in the practice of the present invention. An exemplary rivet 225 is illustrated in FIGS. 18 and 19. The rivet 225 includes a chamfered head portion 227 (with a flat end surface surrounded by a chamfered edge) and a stem portion 228 of sufficient diameter and length to extend through the lamination plate stack. When the lock body is assembled, the narrow end 229 of the rivet 225 may be riveted or peened to secure the lock body plates as a compressed stack. It should be understood that any suitable hardware can be used to secure the plate stack in the practice of this invention.

As shown in FIG. 17, the ribs 220, 226, 228 not utilized to support the rivets 225*a*, 225*b* can provide support to the sleeve 210 and further act to define the exterior shape of the lock 200. As discussed, the endpoints of outer ribs 226, 228 and center rib 220 all extend to be tangent with an axis parallel to a longitudinal axis $A_1$ of the sleeve 10 (see FIG. 14). In this position, the axis defined by the endpoint of the ribs 220, 226, 228 aligns with the outer edge 236 of the lamination plate 208. As shown, the sleeve wall 218 and outer edge 236 define cavities 238 between the sleeve and the plate stack. The shape, size and number of these cavities will vary and be at least partially a function of the rib pattern of the sleeve 210.

Figure 20:
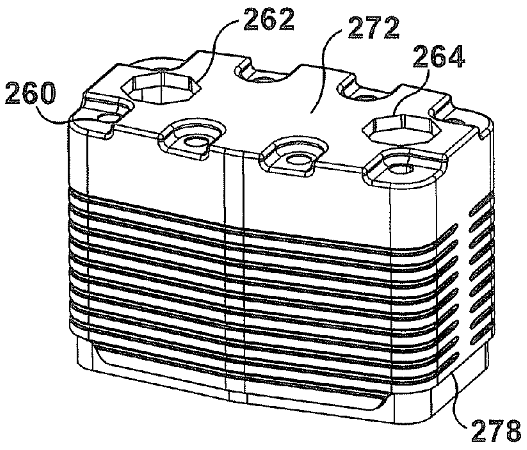
FIG. 20 is a front perspective view of another sleeve.
Figure 29:
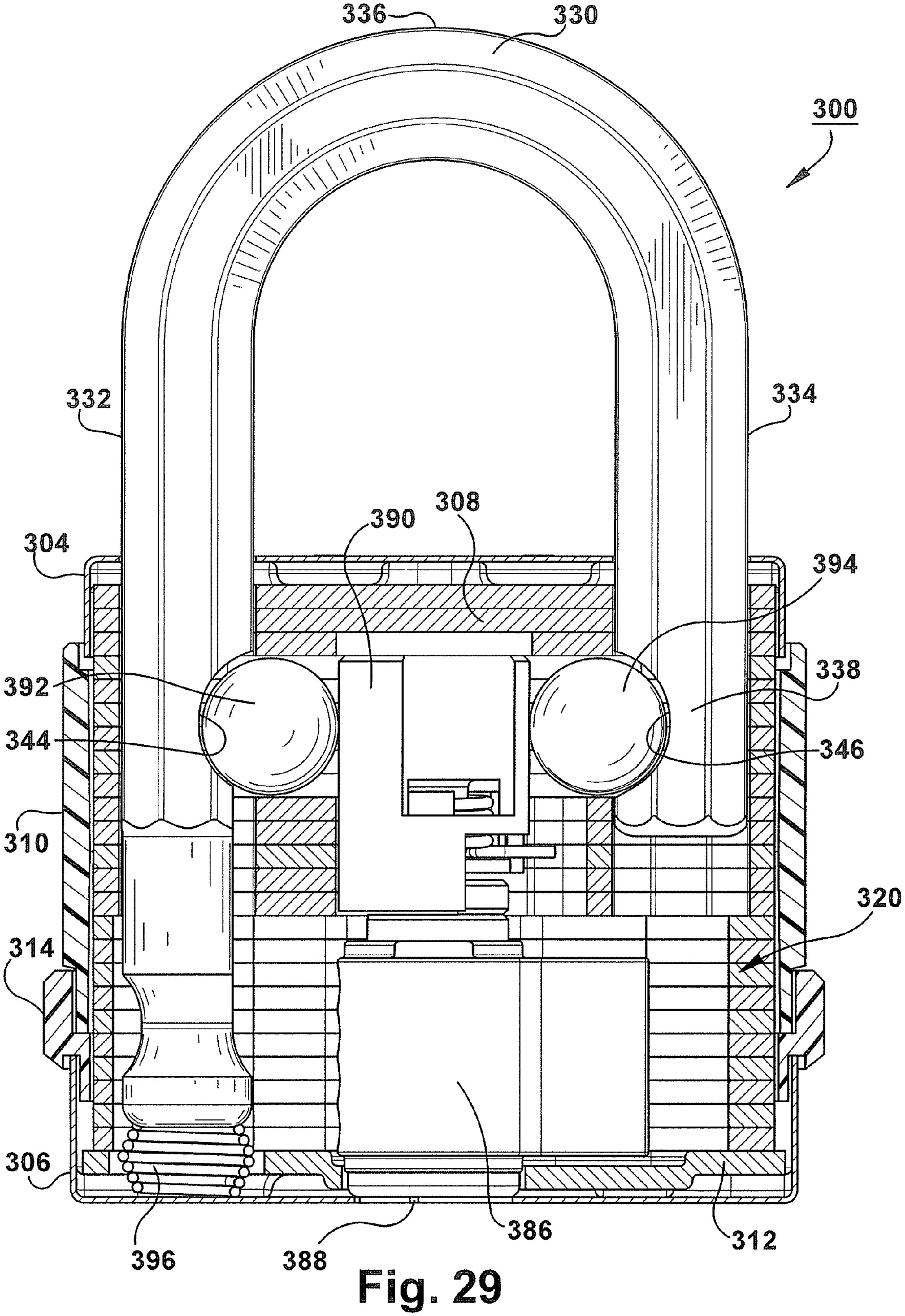
FIG. 29 is a cross-sectional view of the padlock of FIG. 28.

To protect first and second end portions 122, 124 of a lock body 130 (see FIG. 12) and to entirely surround the lock body, end caps may be provided on one or both of the end portions of the lock body (as shown, for example, in FIGS. 28 and 29). In one embodiment, the sleeve and end caps comprise separate components configured to fit together to enclose the lock body. In another embodiment, a sleeve may be provided with an integral end cap portion for covering an end portion of the lock body. Referring now to FIGS. 20-24, a lock sleeve 270 constructed in accordance with another embodiment of the present invention is shown. As shown, the sleeve 270 includes an integrally molded top cap 272 and a sleeve portion 274. FIGS. 20 and 24 shown an outer surface with a decorative laminated appearance and an indent portion 276 defined by a ridge 278. As discussed, the indent portion may accommodate a plastic bumper.

Figure 22:
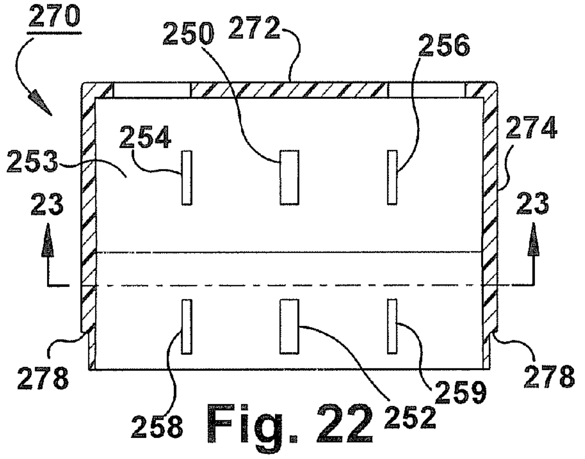
FIG. 22 is a cross-sectional view of the lock sleeve of FIG. 20, shown along the lines 22-22 of FIG. 21.
Figure 23:
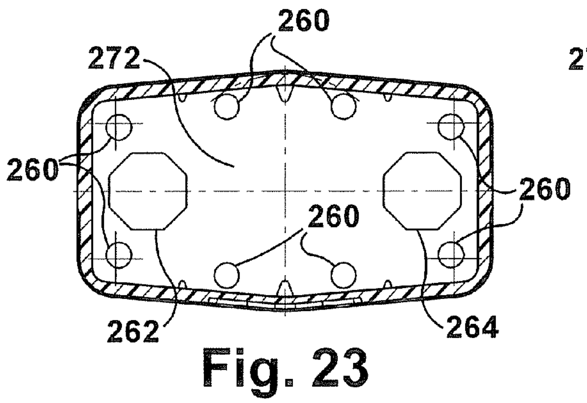
FIG. 23 is another cross-sectional view of the lock sleeve of FIG. 20, shown along the lines 23-23 of FIG. 22.
Figure 24:
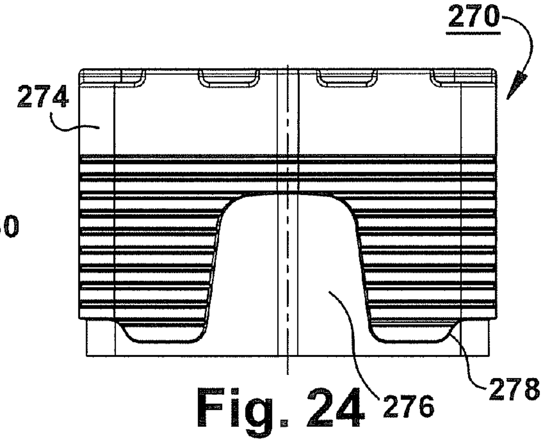
FIG. 24 is a rear view of the lock sleeve of FIG. 20.

The sleeve 270 may include a different exemplary internal rib pattern, as best illustrated in FIGS. 22 and 23. Two non-contiguous center ribs 250, 252 extend internally from a center of a wall 253. Four outer ribs 254, 256, 258, 259 extend from the wall on either side of the center ribs 250, 252. The illustrated rib pattern is exemplary only and it should be understood by one with ordinary skill in the art that any pattern of protrusions may be used in the practice of the present invention.

Figure 21:
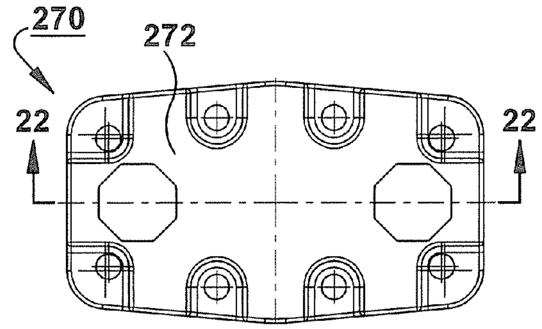
FIG. 21 is a top view of the lock sleeve of FIG. 20.

While the sleeve 270 may be affixed to the lock body in many different ways, in one embodiment, the fasteners used to secure the plates of a laminated lock body in a stack may also secure an end cap portion to the lock body. In the illustrated embodiment, as shown in FIGS. 20 and 21, the top cap may include apertures 260 for mounting rivets through a stack of lamination plates, consistent with the laminated lock body arrangement of FIG. 12. As best shown in FIG. 20, the cap portion 272 may include recesses in which each of the fastener apertures 260 are disposed, such that an end portion of the fastener (e.g., a rivet head) is retained within the recess. In such an arrangement, the end cap becomes fastened to and essentially a part of the lock body, while at the same time surrounding the lock body. Two shackle holes 262, 264 are also included in the cap portion 272 to accommodate legs of a shackle.

As shown in FIGS. 28 and 29, an exemplary lock 300 may include an outer sleeve 310 disposed between a separate top cap 304 and a bottom cap 306. One or both of the caps 304, 306 may overlap, abut, or otherwise engage the sleeve 310 to secure the sleeve 310 on the lock body 330. The sleeve 310 and caps 304, 306 enclose or surround a stack of various lamination plates 308 and a bottom plate 312, in addition to the key cylinder 386 and various other internal lock components that form the lock body. As mentioned, an exterior plastic bumper 314 may protect the lock 300 from damage by dampening impact from dropping or other forces. Additionally, as shown, the bumper 314 may cover or span a gap or seam between the sleeve 310 and at least one of the end caps 304, 306.

Many different sizes, types, and shapes of shackles may be used with padlocks that include one or more of the inventive aspects of the present application. While a conventional U-shaped shackle having a circular cross section may be used, in another embodiment, a shackle may be provided with a multi-faceted cross section. Beyond the aesthetic appeal of a multi-faceted shackle, such an embodiment may provide additional benefits, such as, for example, machinability of features (e.g., ball bearing notches) on the flat "facet" surfaces, and potential resistance to bolt cutter attack. Additionally, when combined with certain features of a corresponding lock body, the shackle and lock body may be designed to prevent the shackle from being "locked" outside of the lock body.

Many different multi-faceted shackles may be used with the inventive features of this applications, including shackles with cross sections having a plurality of facets of equal length. While the number of facets may vary, in one embodiment, an eight sided or octagonal shackle may be used. In one such example, the octagonal shackle is provided with a flat surface or facet along an inner surface of the shackle, which may facilitate machining of ball bearing notches in the shackle.

Figure 25:
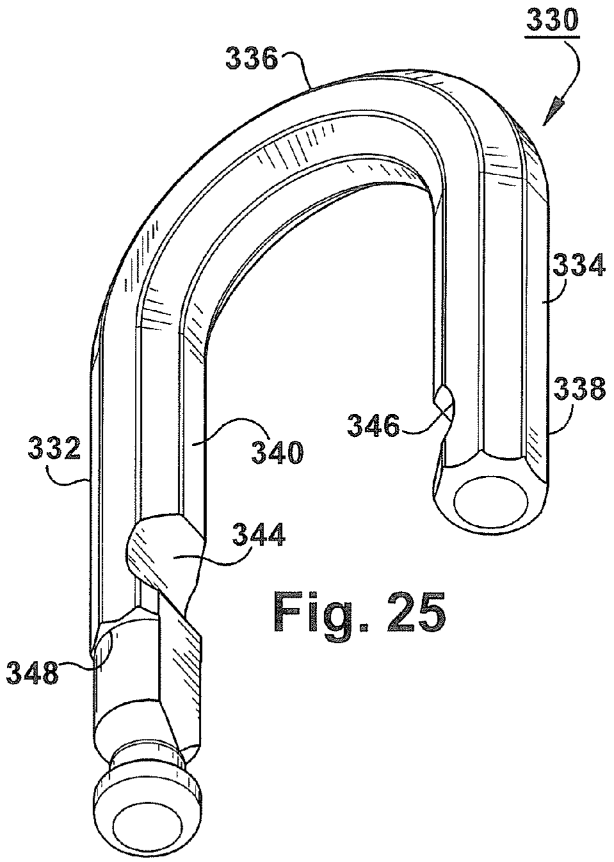
FIG. 25 is a perspective view of a lock shackle having a multi-faceted cross-sectional portion.

FIG. 25 is a perspective view of one such exemplary embodiment of an octagonal shackle 330. The shackle 330 is generally U-shaped and includes a long leg 332 and a short leg 334 joined by an arcuate portion 336. The arcuate portion 336 of the shackle, as well as portions of both legs 332, 334 are multi-faceted and as shown, include eight sides of equal width. It should be understood by others with ordinary skill in the art that other multi-faceted shackle designs may be used in the practice of the present invention, such as for example, a hexagonal shackle. As shown in FIG. 25, the octagonal portion of the shackle 330 extends to an end portion 338 of the short leg 334. The extending end portion 338 can also be seen in FIG. 26, which is a side view of the lock shackle 330. FIG. 27 is a bottom view of the lock shackle 330 and shows the octagonal shape extending to essentially the termination of the end portion 338.

Referring again to FIG. 26, the structure of the lock shackle 330 has several beneficial characteristics. The inside surface 340 of the long leg 332 and the inside surface 342 of the short leg 334 are planar and parallel with respect to each other. The flat surfaces 340, 342, respectively, define concave ball bearing notches 344, 346, respectively, sized for receiving ball bearings within a lock assembly when the lock is in a locked condition. By positioning the flat surfaces 340, 342 on the inside of the shackle bend, manufacturing of the shackle may be less complex and more inexpensive as compared to having an edge surface or curved surface on the inside of the shackle bend. The exemplary shackle includes a shoulder 348 on the long leg 332 but reduces manufacturing time and costs by eliminating machining operations on the short leg 334.

Figure 26:
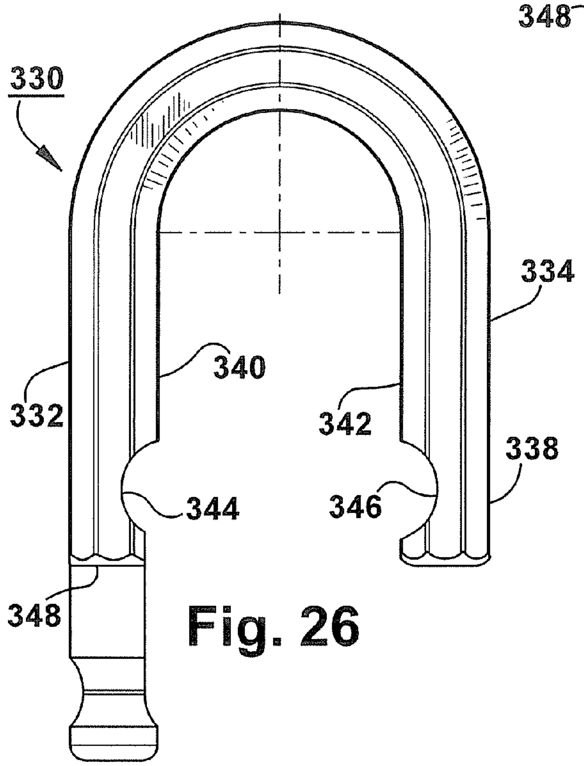
FIG. 26 is a side view of the lock shackle of FIG. 25.
Figure 27:
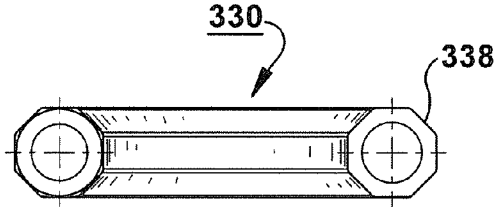
FIG. 27 is a bottom view of the lock shackle of FIG. 25.

While the shackle 330 of FIGS. 25-27 may be assembled with many different types of lock bodies including many different types of shackle holes sized to receive the shackle (such as, for example, conventional circular shackle holes), in one embodiment, one or both multi-faceted leg portions may be received in corresponding multi-faceted shackle holes sized to closely receive the multi-faceted leg portions of the shackle. While multi-faceted shackle holes may be difficult to machine in a larger block of material, the use of a laminated stack of plates to form the lock body allows for multi-faceted shackle holes to be more easily formed from several plates having multi-faceted stamped cutouts, such as, for example, the lock plates 90, 92 of FIGS. 10*a-b* and 11*a-b*. The close fit between the shackle and the shackle holes may minimize the introduction of moisture and other contaminants into the lock and may deter tampering, such as shimming of the lock.

As another advantage, the lock body and shackle may be configured to prevent locking of the shackle with the short leg outside of the lock body. With padlocks having conventional short legs, it is possible to press down on the shackle when the short end is not co-axially aligned with its corresponding entry aperture, where the ball bearing is able to re-enter the ball bearing notch of the long leg, despite the short leg being rotated out of alignment with the lock body. This may result in inconvenience for the user. The exemplary shackle 330 and lock body (see FIG. 12) prevent the shackle 330 from being locked in such a position. If the long leg 332 is rotated out of position between 0° and 45°, the short leg 334 end portion 336 will interfere with the outside of the lock body 120 (FIG. 12) upon downward movement, due to misalignment with the corresponding shackle hole. If the long leg is rotated more than 45° but less than 90°, the long leg shackle hole 132 will be misaligned with the multi-faceted portion of the long leg 332, preventing the multi-faceted portion of the long leg from sliding into the lock body 120. If the long leg 332 is rotated 90° or any angle greater than 90° and the shackle is pressed downward, the ball bearing notch 344 in the long leg will not be aligned with the ball bearing, preventing the ball bearing from entering the notch 344 for locking engagement.

FIGS. 28 and 29 illustrate an exemplary padlock 300 utilizing several of the inventive features of the present application, including, for example, a laminated lock body 320 formed from a stamping process described above. The padlock 300 also includes a sleeve 310 and end caps 304, 306 for protecting, surrounding, and supporting the lock body 320 and rivets 325, and a multi-faceted shackle 330 with complementary shaped shackle holes in the lock body 320 and end cap 304 for closely receiving the multi-faceted shackle leg portions 332, 334. As shown, the shackle 330 is illustrated in a locked position within the lock body 320. The exemplary lock shackle 330 is octagonal (e.g., having a multi-faceted cross section), with multi-faceted portions of both shackle legs 332, 334 extending into the lock body 320.

The illustrated lock includes a key cylinder 386 (such as, for example, a conventional pin and tumbler key cylinder) that is operable by insertion of a proper key into a key slot 388 on a bottom face (or second end portion) of the lock 300. Upon rotation of the key cylinder 386, an extension 390 rotates to allow two ball bearings 392, 394 to move laterally inward and out of engagement with the shackle notches 344, 346. A shackle spring 396 subsequently forces the shackle 330 upward into an opened position. In this opened position (not shown), the end portion 338 of the short leg 334 is disengaged or separated from the lock body 320. It should be appreciated by others with ordinary skill in the art that other locking mechanisms can be used in the practice of the present invention, such as, for example, a wafer and sidebar mechanism or a combination dial.

The lock body 320 is at least partially covered by an outer sleeve 310 disposed between a top cap 304 and a bottom cap 306. The sleeve is placed over the stack of various laminated plates 308 (which may be consistent with the plates 82, 84, 86, 88, 90, 92 of FIGS. 6*a*-11*b*) and a bottom plate 312. The bottom plate 312 forms a foundation for the stack and may be generally thicker than any individual plate 308. As shown, six different lamination plates are used in a combination of twenty four total plates. It should be understood by others with ordinary skill in the art that many combinations of plates and plate designs may be used in the practice of the present invention. As best shown in FIG. 29, cutouts in the plates align to accommodate the long shackle leg 332, short shackle leg 334 and other mechanical components in the lock 300. An exterior plastic bumper 354 protects the lock 300 and adjacent surfaces from damage by dampening impact from dropping or other forces.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A method for manufacturing a plurality of plates for a laminated padlock body, the method comprising:

providing a strip of material having parallel first and second longitudinal edges;

positioning a first portion of the strip at a first location;

cutting a first set of fastener holes in the first portion;

engaging at least one of the first set of fastener holes and indexing the strip to position a second portion of the strip at the first location;

cutting a second set of fastener holes in the second portion;

cutting the strip along a first lateral axis, a second lateral axis, and a third lateral axis, such that the first portion forms a first lock body plate and the second portion forms a second lock body plate;

wherein when the first lock body plate is stacked with the second lock body plate, the first set of fastener holes aligns with the second set of fastener holes.

2. The method of claim 1, further comprising cutting at least one figure "8" shaped cutout spanning the second lateral axis, such that approximately one half of the cutout is disposed in each of the first and second portions.

3. The method of claim 1, further comprising stamping at least one indentation in each of the first and second portions, each of the indentations forming a recess on a first side of the strip and a nib on the second side of the strip, wherein when the first lock body plate is stacked with the second lock body plate, the nib of the first lock body plate is received in the recess of the second lock body plate.

4. The method of claim 1, further comprising cutting a "v" shaped notch in each side of the strip, wherein each of the notches is centered on the second lateral axis.

5. The method of claim 1, further comprising cutting a first set of shackle cutouts in the first portion and a second set of shackle cutouts in the second portion, wherein when the first lock body plate is stacked with the second lock body plate, the first and second sets of shackle cutouts align with each other for receiving first and second legs of a shackle therethrough.

6. The method of claim 5, wherein the first and second sets of shackle cut-outs comprise multi-faceted cutouts.

7. The method of claim 5, wherein the multi-faceted cutouts comprise octagonal cutouts.

* * * * *